(12) United States Patent
Fodor

(10) Patent No.: US 9,586,621 B2
(45) Date of Patent: Mar. 7, 2017

(54) BODY RAIL FOR A MOTOR VEHICLE

(71) Applicant: Bayerische Motoren Werke Aktiengesellschaft, Munich (DE)

(72) Inventor: Balazs Fodor, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/933,686

(22) Filed: Nov. 5, 2015

(65) Prior Publication Data

US 2016/0059893 A1    Mar. 3, 2016

Related U.S. Application Data

(63) Continuation of application No. PCT/EP2014/058421, filed on Apr. 25, 2014.

(30) Foreign Application Priority Data

May 6, 2013  (DE) .................. 10 2013 208 265

(51) Int. Cl.
*B60R 19/34* (2006.01)
*B62D 21/15* (2006.01)
(Continued)

(52) U.S. Cl.
CPC ............ *B62D 21/155* (2013.01); *B60R 19/18* (2013.01); *B60R 19/34* (2013.01); *B62D 21/152* (2013.01);
(Continued)

(58) Field of Classification Search
CPC .... B60R 19/34; B62D 21/152; B62D 21/155; B62D 21/15; B62D 25/08; B62D 29/04; B62D 29/041; B62D 29/043
(Continued)

(56) References Cited

U.S. PATENT DOCUMENTS 4,431,221 A * 2/1984 Jahnle ................. B62D 21/152
                                                188/377
4,684,151 A * 8/1987 Drewek ............... B62D 21/152
                                                280/784
(Continued)

FOREIGN PATENT DOCUMENTS

CN         202389464 U      8/2012
DE         699 10 426 T2    6/2004
(Continued)

OTHER PUBLICATIONS

International Search Report (PCT/ISA/210) issued in PCT Application No. PCT/EP2014/058421 dated Sep. 5, 2014 with English translation (Six (6) pages).
(Continued)

*Primary Examiner* — H Gutman
(74) *Attorney, Agent, or Firm* — Crowell & Moring LLP

(57) ABSTRACT

A vehicle body rail for a motor vehicle, which is constructed of fiber-reinforced plastic and is designed as a vehicle body rail which absorbs energy in the event of a collision of the motor vehicle, includes a wall. The wall is provided with indentations and/or elevations such that, in the event of an application of a predetermined collision threshold load in a longitudinal direction of the vehicle body rail, a failure of the wall by fragmentation takes place in the area of the indentations and/or elevations.

18 Claims, 2 Drawing Sheets

(51) Int. Cl.
  *B62D 29/04* (2006.01)
  *B60R 19/18* (2006.01)
  *F16F 7/12* (2006.01)

(52) U.S. Cl.
  CPC .......... *B62D 29/04* (2013.01); *B62D 29/041* (2013.01); *F16F 7/12* (2013.01); *B60R 2019/1853* (2013.01)

(58) Field of Classification Search
  USPC .................................................. 296/187.09
  See application file for complete search history.

(56) References Cited

U.S. PATENT DOCUMENTS

| | | | | |
|---|---|---|---|---|
| 4,742,899 A * | 5/1988 | Thornton | ................ | E04C 3/29 188/377 |
| 5,096,223 A * | 3/1992 | Tekelly | ................ | B60R 21/045 280/748 |
| 5,118,160 A * | 6/1992 | Kitagawa | ............ | B62D 21/152 296/187.03 |
| 5,419,416 A * | 5/1995 | Miyashita | ................ | F16F 7/12 188/371 |
| 5,442,365 A * | 8/1995 | Lewis | ................ | G01S 7/2813 342/19 |
| 5,514,448 A * | 5/1996 | Kishi | ................ | B29C 70/086 428/113 |
| 5,732,801 A * | 3/1998 | Gertz | ................ | F16F 7/123 188/377 |
| 5,785,367 A * | 7/1998 | Baumann | ................ | B60R 19/18 293/133 |
| 5,876,077 A * | 3/1999 | Miskech | ................ | B60R 19/18 293/132 |
| 6,174,009 B1 * | 1/2001 | McKeon | ................ | B60R 19/34 188/377 |
| 6,296,301 B1 * | 10/2001 | Schroeder | ............ | B62D 29/046 296/187.02 |
| 6,406,088 B1 | 6/2002 | Tate | | |
| 6,474,708 B1 * | 11/2002 | Gehringhoff | ........... | B60R 19/18 188/376 |
| 6,695,393 B1 * | 2/2004 | Aouadi | ................ | B62D 21/152 296/187.09 |
| 6,893,065 B2 * | 5/2005 | Seksaria | ................ | B60K 5/12 293/133 |
| 6,962,390 B1 * | 11/2005 | Myers | ................ | B62D 21/02 180/312 |
| 7,070,217 B2 * | 7/2006 | Longo | ................ | B60R 19/34 293/132 |
| 7,380,830 B2 * | 6/2008 | Mitsui | ................ | B60T 17/046 180/274 |
| 7,842,378 B2 * | 11/2010 | Harada | ................ | F16F 7/124 428/137 |
| 9,403,498 B2 * | 8/2016 | Hoschouer | ............. | B60R 19/34 |
| 2008/0054665 A1 | 3/2008 | Baccouche et al. | | |
| 2012/0049571 A1 | 3/2012 | Katou et al. | | |
| 2012/0133177 A1 | 5/2012 | Baccouche et al. | | |
| 2016/0159400 A1 * | 6/2016 | Matsuoka | ........... | B62D 21/152 296/187.11 |

FOREIGN PATENT DOCUMENTS

| | | |
|---|---|---|
| DE | 103 21 766 A1 | 12/2004 |
| DE | 103 29 461 A1 | 2/2005 |
| DE | 101 35 903 B4 | 2/2007 |
| DE | 10 2009 021 961 A1 | 11/2010 |
| DE | 10 2011 113 441 A1 | 3/2013 |
| EP | 1 997 721 A1 | 12/2008 |
| EP | 2 423 078 A1 | 2/2012 |
| FR | 2 866 619 A1 | 8/2005 |
| GB | 2 367 270 A | 4/2002 |
| JP | 2008-94309 A | 4/2008 |
| JP | 2009-287749 A | 12/2009 |
| RU | 2458501 C1 * | 8/2012 |
| WO | WO 00/78575 A1 | 12/2000 |
| WO | WO 2004035957 A1 * | 4/2004 .......... E01D 19/125 |
| WO | WO 2004098820 A1 * | 11/2004 .............. B32B 7/00 |

OTHER PUBLICATIONS

German-language Search Report issued in counterpart German Application No. 10 2013 208 265.7 dated Jan. 7, 2014 with partial English translation (Ten (10) pages).
Chinese Office Action issued in counterpart Chinese Application No. 201480025382.1 dated Aug. 3, 2016 with English translation (13 pages).

* cited by examiner

BODY RAIL FOR A MOTOR VEHICLE

CROSS REFERENCE TO RELATED APPLICATIONS

This application is a continuation of PCT International Application No. PCT/EP2014/058421, filed Apr. 25, 2014, which claims priority under 35 U.S.C. §119 from German Patent Application No. 10 2013 208 265.7, filed May 6, 2013, the entire disclosures of which are herein expressly incorporated by reference.

BACKGROUND AND SUMMARY OF THE INVENTION

Embodiments of the present invention relate to a body rail for a motor vehicle, which is made of fiber-reinforced plastic and is designed as a rail which absorbs energy in the event of a motor vehicle collision.

Vehicle body structures, particularly a body rail, for a motor vehicle may be designed such that, in the event of a collision of the motor vehicle, it will fail while absorbing collision energy. Body rails made of metallic materials are designed such that, in the case of a defined level of force, they appropriately deform over a distance intended for this purpose. Tube-shaped rails having a polygonal (for example, rectangular) or round profile may be used for vehicle body structures made of carbon-fiber-reinforced plastic (CFRP) or other fiber-reinforced plastics in motor vehicles, particularly passenger cars, with which profile a deformation element is usually connected which is called a crash box. At its other end, the crash box is connected with a bumper. During the frontal impact, the bumper is used as an energy absorber before the crash box. When the energy absorption capacity of the crash box is exhausted and the kinetic energy has not yet been completely reduced, the deformed/destroyed bumper or crash box will impact on the vehicle body rail, which in the front end region, in the case of motor vehicles having a front-mounted engine, is also called an engine mount. As a result, a failure is initiated at the vehicle body rail. When the rail consists of CFRP, the failure follows the so-called "crushing". In the case of the "crushing" failure mechanism, a more or less complete disintegration (also called pulverization or fragmentation or splintering) of the rail takes place, primarily as a brittle fracture. A further form of crushing is a defined deflection of the CFRP material by 180° directly at the impact surface, this deflection also being called "peeling-open" or "peeling". In this case, the reduction of the kinetic collision energy is caused by a fiber break mechanism in connection with friction. These two failure mechanisms function effectively during a frontal impact, at which the force upon the rail extends perpendicularly to a rail cross-section.

It is an object of an embodiment of the present invention to create a vehicle body rail for a motor vehicle which, without significantly influencing an installation space required for the body rail, makes it possible to cause a failure during a collision of the motor vehicle while the force level differs.

This and other objects are achieved by a vehicle body rail for a motor vehicle which has the characteristics disclosed in this application. Further embodiments of the invention are indicated in the dependent claims of this application.

A vehicle body rail for a motor vehicle, particularly a passenger car, according to an embodiment of the present invention is constructed of a fiber-reinforced plastic and is designed as a vehicle body rail which absorbs energy in the event of a collision of the motor vehicle. A vehicle body rail of this type is a component of a so-called "crash" structure of the vehicle body and is also called a vehicle body structure rail, because it is a structural part of the vehicle body. The vehicle body rail has at least one wall, which is provided with indentations and/or elevations such that, in the event of an application of a predetermined collision threshold load in a longitudinal direction of the vehicle body rail, a failing of the wall by fragmentation will take place in the area of the indentations and/or elevations.

A failing by fragmentation, as indicated in connection with the above-discussion, is a small-scale brittle failure, during which the fibers break into more or less small parts and the wall therefore "splinters", thus breaks up into small fragments/particles. This type of failure takes place at a relatively high level of force, so that a relatively large amount of collision energy can be reduced over a defined failure distance.

According to a further development of the vehicle body rail, the indentations and/or elevations are formed in the wall in such a manner that a failure of the wall can be controlled corresponding to a predefined progression of force along a failure distance of the vehicle body rail, or a progression of force at which a failure of the wall/vehicle body rail takes place along the failure distance of the vehicle body rail, can be appropriately controlled—i.e. particularly can be controlled according to a desired progression of force. In other words, the indentations and/or elevations which promote a fragmentation are designed such that a smaller-part fragmentation or a larger-part fragmentation or no fragmentation at all takes place corresponding to a desired predefined progression of force. Correspondingly, the body rail can fail over a defined distance in the case of a high force, whereby a large amount of collision energy is absorbed, and, as the failure progresses, can fail at a different point and in another area of the body rail in the case of a lower force, so that a smaller amount of collision energy is absorbed at this other point and at this point in time at which the body rail fails at the other point.

Particularly in its longitudinal direction, the body structure rail may have at least two different failure sections arranged behind one another, which fail corresponding to the different arrangement and/or design of the indentations and/or elevations at different force levels in the event of the collision of the motor vehicle. In the longitudinal direction, the body structure rail may also have more than two failure sections, which each fail at different or mutually merging force progressions.

A high force level means that, while the effective collision mass of the motor vehicle is the same, a deceleration/acceleration acting upon a vehicle occupant is relatively high. A low force level means that, while the effective collision mass is the same, a lower deceleration/acceleration acts upon a vehicle occupant compartment and thereby upon a vehicle occupant. Assuming that an effective mass of the motor vehicle changes in the course of a collision of the motor vehicle, this also has an effect on a deceleration/acceleration, in the case of a reduction of the effective mass, even a higher force level being conceivable while the deceleration/acceleration is the same. In this respect, it is particularly easy according to an embodiment of the present invention to control a progression of force and thereby a deceleration/acceleration acting upon the motor vehicle occupant compartment and the vehicle occupant, and particularly to prevent that a deceleration/acceleration exceeds a defined threshold value, without significantly changing an installation space of the body rail and significantly increasing the weight of the body rail.

The failure of the body rail or of the wall between a failure by fragmentation and a failure by peeling can preferably be controlled by way of a failure distance of the body rail. In the case of a failure by peeling, fibers tear at a significantly larger scale than in the case of a failure by fragmentation. A failure by peeling is promoted particularly in the case of completely even wall surfaces, in which case the fibers tear, for example, in the area of an end of the wall and a transition to another wall and then peel off in large areas.

In this case, the targeted placing of indentations and/or elevations at suitable points hinders a failure by peeling and promotes a fragmentation, because each indentation and/or elevation means a deflection of material, particularly a fiber deflection. At points at which fibers are deflected in their direction and therefore curved, a tearing of the fibers is promoted in the case of the brittle failure. In other words, a smaller-part failure takes place, the more curvatures/unevennesses the wall has, the more indentations and/or elevations representing such curvatures/unevennesses.

According to a further development of the body rail, the wall has a substantially even construction, except for the indentations and/or elevations. In this context, the term "even" means flat; the wall as a whole is not curved. As a result, a failure by peeling is particularly promoted at locations in the load direction at which no elevations or indentations are present and the fibers are arranged in a correspondingly straight e.g., not curved manner. A failure by fragmentation can be promoted at these locations by the forming of elevations and indentations in the flat wall.

The body rail or the plastic material of the body rail is preferably reinforced by continuous fibers. Continuous fibers considerably promote the stiffness and stability of the body rail. The fibers preferably follow a course of the wall with the indentations and/or elevations in conformity with the indentations and elevations. In other words, the continuous fibers are curved at the corresponding transitions to the indentations and elevations respectively. As explained above, a fragmentation is particularly promoted at these locations.

By way of a continuous production process, the fibers can be arranged corresponding to the indentations and/or elevations. Conceivable production processes are winding processes, braiding processes and pultrusion processes.

By way of such continuous production processes, a body rail of suitable stability can be produced in a particularly simple manner.

By way of processes of this type, indentations and elevations can be formed particularly easily in that a diameter is enlarged during the winding process or braiding process or pultrusion process.

As an alternative, a non-continuous production process for the arrangement of fibers is also comtemplated.

According to a further development, the indentations and/or elevations extend in a longitudinal direction of the body rail, e.g., substantially parallel to the longitudinal direction of the body rail.

In the case of the body rail, the indentations may be grooves formed parallel to the longitudinal direction of the rail. In particular, the indentations may be formed on an exterior side of the wall of the rail.

Also, the elevations of the body rail may be ridges formed parallel to the longitudinal direction of the rail. In particular, the ridges may be formed on an interior side of the wall of the rail.

As a result, an increase of a force level in the event of a collision can particularly easily be generated by a solution that is neutral with respect to the installation space. In other words, no body rail has to be provided that has a thicker wall thickness or a larger diameter. In contrast, it is sufficient to form only additional indentations and/or elevations in the wall of the body rail, which do not change the installation space and do not significantly change the weight of the rail, the wall thickness of the body rail substantially remaining the same. Indentations/elevations in the form of grooves/ridges can be produced particularly easily.

Elevations that correspond to indentations on one side of the wall may be arranged on the other side of the wall, so that a wall thickness of the body rail remains substantially the same along its circumference.

The rail is therefore not weakened by the indentations, and a weight of the rail is increased only relatively slightly.

The grooves may be formed to be tapering and/or widening in the longitudinal direction. Changes of the geometry of the grooves may be implemented corresponding to a desired progression of the failure force.

As a result, a progression of the failure force between a peeling-open and a fine, very-small-particle fragmentation can be formed that is simple and neutral with respect to the installation space.

The body rail may be a profiled rail with an open profile and/or a closed profile. This type of profile has several walls, in which case the indentations and/or elevations may be formed in one or more walls.

The indentations and/or elevations may be formed particularly on wider wall sections in the case of a body rail with several walls. In particular, in the case of a body rail with several walls, the indentations and/or elevations may be formed on the wider walls of the body rail. A body rail with a rectangular—not square—cross-section, for example, has two wide walls and two narrow walls.

In the case of a wide wall, depending on the presence and formation of the indentations and/or elevations, a particularly large difference can be achieved between small-particle and large-scale failure and thereby a particularly large difference in the progression of the failure force. The providing of indentations and/or elevations is therefore more effective in the case of a wider wall than in the case of a narrower wall.

The body rail may be a hollow rail, e.g., a rail with a closed profile, of a polygonal, advantageously substantially rectangular cross-section.

According to an embodiment of the present invention, the body rail may be formed in all its further developments of carbon-fiber-reinforced plastic, which is also called carbon fiber composite material. As an alternative, a glass-fiber-reinforced or an aramid-fiber-reinforced plastic or a plastic/composite material reinforced with any other suitable fibers can be used.

According to a further development, a wall thickness of the wall of the body rail may be substantially constant. This means that the wall thickness is also substantially constant in locations with elevations and/or indentations.

In particular, a wall thickness of the wall may be constant at least in one direction transversely to the longitudinal direction of the rail.

The body rail may be arranged in a forward load path for a frontal collision of the motor vehicle and/or in a rearward load path for a rear collision of the motor vehicle. The body rail may be directly or indirectly, for example, by means of a deformation element, e.g., a crash box, connected with a bumper cross member. The deformation element is implemented, for example, in an exchangeable manner, and is used for the absorption of collision energy in a low-speed range of the motor vehicle, without irreversibly damaging the body rail arranged behind it.

According to an embodiment of the present invention, the body rail may be a forward side rail, which, in the case of motor vehicles with a front-mounted engine, is also called an engine mount, or may be a rearward side rail. The forward side rail may extend over a predominant portion of a front end, for example, from the bumper cross-member or the deformation element to a front wall, which separates the front end from the vehicle occupant compartment of the motor vehicle.

However, the body rail may also, for example, be an A-pillar or a roof frame or a vehicle body sill or the like.

The body rail may have at least one high-collision-energy absorption section in its longitudinal direction, in which section the indentations and/or elevations are formed in the wall. Likewise, the body rail may have a low-collision-energy absorption section in which no indentations and/or elevations are formed in the wall. The body rail therefore has at least two different failure sections.

The above-described further developing characteristics may be arbitrarily combined with one another to the extent possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
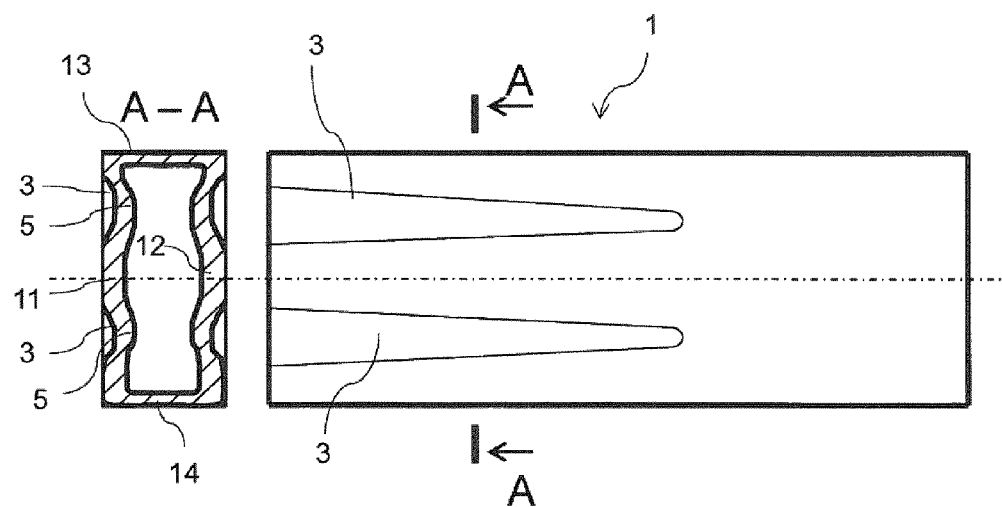
FIG. 1 is a schematic lateral view and a sectional view of a body rail.

FIG. 1 is a schematic lateral view of a body rail 1. As illustrated in a schematic sectional view along Line A-A, the body rail 1 has a substantially rectangular cross-section. At its long sides, the rectangular body rail 1 has two mutually opposite walls 11 and 12. The mutually opposite walls 11 and 12 are connected on the short sides also by mutually opposite walls 13 and 14, the four walls 11, 12, 13, 14 together forming a rectangular profile of the vehicle rail 1. Two grooves 3 respectively, which represent the indentations, are formed in the mutually opposite walls 11 and 12. The grooves 3 are formed particularly on the exterior sides (outer sides) of the walls 11 and 12. The grooves 3 extend parallel to a longitudinal direction of the body rail 1. Elevations or ridges 5, which correspond to the grooves 3, are formed on the interior sides (inner sides) of the walls 11 and 12. The grooves 3 and the elevations 5 are designed to correspond to one another particularly such that a wall thickness of the walls 11 and 12 does not change or is substantially constant. The grooves 3 as well as the elevations 5 have a tapering course and extend from a beginning (on the left in FIG. 1) of the body rail 1 over a defined length along the longitudinal direction of the body rail 1. The groove 3 is the widest at the beginning of the body rail 1 and tapers continuously to its end. The section of the body rail with the grooves 3 and elevations 5 is a high-collision-energy absorption section. In a section of the body rail 1 that follows, e.g., the right-hand section in FIG. 1, no groove or elevation is formed. This section is a low-collision-energy absorption section.

A failure of the body rail 1 during a collision of the motor vehicle will now be explained. The body rail 1 may, for example, be a forward side rail, which frequently is also called an engine mount, in which case a left end of the body rail 1 points in the main traveling direction of the motor vehicle and a right end of the body rail 1 points against a main traveling direction of the motor vehicle. However, the body rail 1 may also be another structurally effective rail in a motor vehicle body which, in the event of a collision of the motor vehicle is stressed along its longitudinal direction. During its failure, such a body rail 1 is used to reduce collision energy and has the purpose of ensuring that a threshold value of a deceleration/acceleration, which acts upon a vehicle occupant, is not exceeded.

If now, as a result of a collision, a collision load acts in the longitudinal direction of the body rail 1, particularly from the direction of the left side in FIG. 1, a failure of the body rail 1 may be induced or triggered at its left end or its forward end with respect to the collision direction, so that a failure is induced at the forward end.

At the forward end, the body rail 1 has particularly wide grooves 3 and elevations 5 corresponding therewith formed in the long side walls 11 and 12. As a result of the grooves 3 and elevations 5, relatively few even sections are formed in the wall 11 or 12 of the rail 1. This results in a relatively small-particle fragmentation of the walls 11 and 12 because the fibers extend along many curvatures. A small-particle fragmentation, in turn, takes place at a relatively high force.

Figure 2:
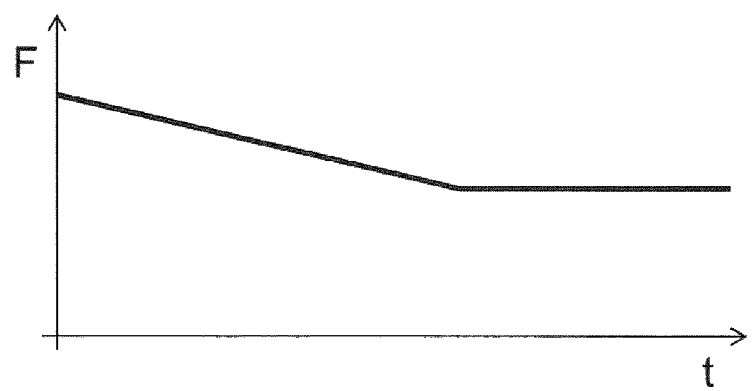
FIG. 2 is a schematic diagram which qualitatively illustrates a progression of force over a time in the event of a failure of the body rail of FIG. 1.

In FIG. 2, a progression of a force during the collision is illustrated qualitatively over time. When the body rail 1 illustrated in FIG. 1 begins to fail at its forward end, this takes place because of the widest point of the grooves 3/elevations 5, in the case of a relatively high force, at an early point in time or a 0 point in time. However, since the grooves 3/elevations 5 become continuously narrower, the even sections will decrease in proportion to the uneven sections, e.g., the grooves and elevations respectively, so that a fragmentation of the walls 11 and 12 will become increasingly coarser. In FIG. 2, this is schematically illustrated by a declining progression of force. When the failure of the body rail 1 now reaches a section in which there are no more grooves and elevations and the walls 11 and 12 extend substantially even, a failure by peeling will thereby be promoted. A failure by peeling occurs at a lower force than a failure by fragmentation. Significantly fewer fibers are broken during a failure by peeling, and the walls 11 and 12 normally bend substantially toward the outside—which means that they are deflected up to 180°, in which case they tear off at the edges to the upper surface and the lower surface or of the upper wall and the lower wall. Starting from the section of the body rail 1 in which there are no longer any grooves and elevations and the geometry of the body rail 1 no longer changes along a length, the failing therefore takes place at a relatively low force, which is substantially constant.

Naturally, the body rail 1, which is shown in FIG. 1, as well as the progression of force, which is shown in FIG. 2, are illustrated in a somewhat idealized manner, but should illustrate the basic principle of this application in a qualitatively good fashion.

Many other geometries of the body rail are conceivable, in which case, as a result of targeted unevennesses in the body rail, which lead to curvatures in the walls and therefore curvatures of fibers, the failure can be controlled in a targeted manner and, in particular, a failure by fragmentation, or a failure by peeling or a smaller-particle failure or a larger-particle failure can be caused which, in each case, takes place at different force levels.

During the course of the collision, this has the particular advantage that, for example, in the case of a smaller effective mass, during the course of the collision the force level at which a failure takes place, can also be reduced, so that a deceleration/acceleration acting upon a vehicle occupant does not exceed a defined threshold value.

Figure 3:
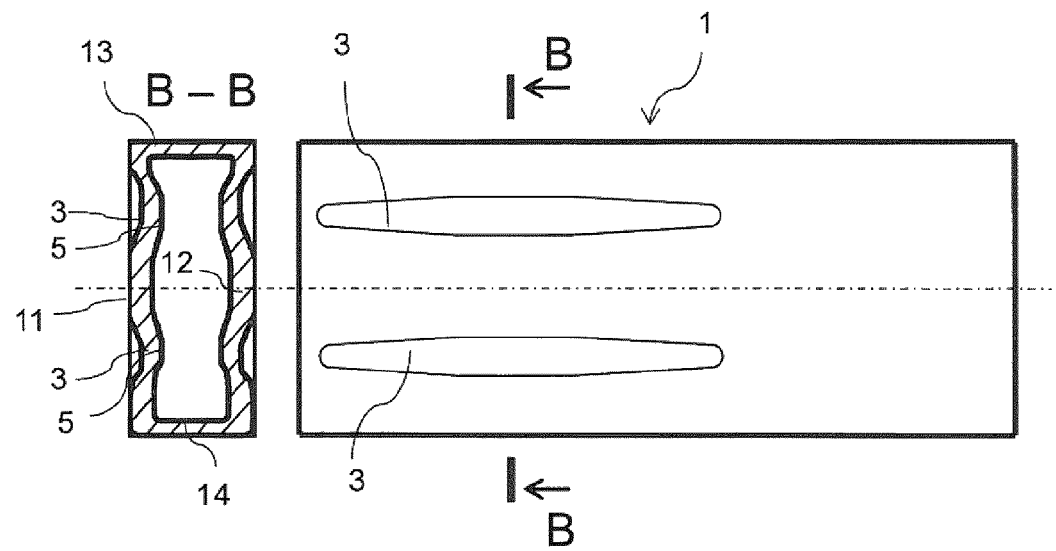
FIG. 3 is a schematic lateral view and a sectional view of a body rail.

FIG. 3 illustrates another body rail 1. For identical or similar characteristics, the same reference numbers will be used as those in the body rail 1 of FIG. 1. In the following, particularly the differences with respect to the body rail 1 of FIG. 1 will be explained, and an explanation of the commonalities with the body rail 1 of FIG. 1 will be omitted.

As shown in FIG. 3, the body rail 1 has indentations 3 and elevations 5 respectively formed in opposite lateral walls 11 and 12 of a rectangular profile. In FIG. 3, however, the indentations 3 and elevations 5 respectively are formed such that, starting from a forward end of the body rail 1, they widen in a slowly progressing manner, have a constant width over a defined distance and taper in a progressing manner in a section that follows.

A failing of the body rail 1 of FIG. 3 also takes place from the left, thus beginning from the forward end of the body rail 1, in which case the failure at the forward end can be triggered correspondingly. In the event of a collision of the motor vehicle, in which a load acts upon the body rail 1 from the left along a longitudinal direction of the body rail 1, the above-described geometry of the indentations 3/elevations 5 has the effect that a force at which the body rail 1 fails is relatively low at the beginning of the failure, then rises continuously, remains constant at a highest level and then continuously drops again corresponding to the tapering of the groove until the force remains constant again at a low level.

The progression of force is caused in that, when a failure begins at the forward end of the body rail 1, this failure at first takes place with a peeling-open because of the absence of grooves 3 and elevations 5, and then changes into a continuously smaller-part fragmentation which, in turn, at straight sections of the grooves 3 and elevations, reaches a constant level. In the area of the tapering grooves 3 and elevations 5, the fragmentation becomes a continuously larger-part fragmentation until it changes into a failure by peeling.

Figure 4:
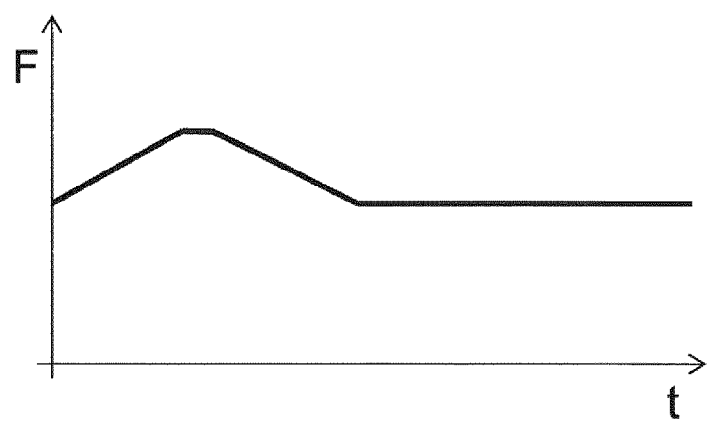
FIG. 4 is a schematic diagram which qualitatively illustrates a progression of force over a time in the event of a failure of the body rail of FIG. 3.

As illustrated in FIGS. 2 and 4, a progression of force during a failure of the rail can be influenced as desired by adapting the geometry of the rail. In particular, the change of geometry takes place by a change of a relationship between even surfaces and curved surfaces, whereby a type of a failure is controlled. In the case of relatively highly curved surfaces, the corresponding walls of the body rail have the tendency to fail by fragmentation, while, in the case of relatively large even surfaces, it is probable that a failing by peeling will occur. As a result of intermediate stages between these types of failures, desired progressions of force thereby become possible over time without significantly changing an installation space of the rail or increasing a weight of the rail.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body rail for a motor vehicle, which is constructed of fiber-reinforced plastic and is designed as a vehicle body rail which absorbs energy in the event of a collision of the motor vehicle, the vehicle body rail comprising:
    a wall, which is provided with indentations and elevations such that, in the event of an application of a predetermined collision threshold load along a longitudinal direction of the vehicle body rail, a failure of the wall by fragmentation takes place in the area of the indentations and elevations, wherein
    the indentations and elevations form longitudinal grooves, and
    the longitudinal grooves extend along a longitudinal direction of the vehicle body rail.

2. The vehicle body rail according to claim 1, wherein the indentations and elevations are formed in the wall such that a failure of the wall can be controlled in accordance with a predefined force progression, and is controlled between a failure by fragmentation and a failure by peeling over a failure distance of the body rail.

3. The vehicle body rail according to claim 1, wherein the wall has substantially even shape except for the indentations and the elevations.

4. The vehicle body rail according to claim 3, wherein the fiber-reinforced plastic is reinforced by continuous fibers, and wherein the continuous fibers follow a course of the wall with the indentations and elevations that is in conformity with the indentations and elevations.

5. The vehicle body rail according to claim 4, wherein the fibers are arranged in a manner corresponding to the indentations and elevations via a winding process, a braiding processes a pultrusion process or a continuous production method.

6. The vehicle body rail according to claim 5, wherein the indentations and the elevations are grooves or ridges that are formed parallel to the longitudinal direction of the body rail, and wherein the grooves are formed on an exterior side of the wall of the vehicle body rail, and the ridges are formed on an interior side of the wall of the vehicle body rail.

7. The vehicle body rail according to claim 6, wherein grooves or ridges are formed to be tapering or widening in the longitudinal direction, and wherein a change of geometry of the grooves or ridges is formed corresponding to a desired progression of the failure force.

8. The vehicle body rail according to claim 7, wherein the vehicle body rail is a profiled rail with an open profile or a closed profile with several walls, and the vehicle body rail is a hollow rail with a substantially rectangular cross-section.

9. The vehicle body rail according to claim 8, wherein the indentations and elevations are arranged in wider wall sections.

10. The vehicle body rail according to claim 9, wherein the vehicle body rail is made of carbon-fiber-reinforced plastic.

11. The vehicle body rail according to claim 10, wherein a thickness of the wall is substantially constant in a direction transversely to the longitudinal direction of the vehicle body rail.

12. The vehicle body rail according to claim 11, wherein the vehicle body rail is arranged in a forward load path in the case of a frontal collision of the motor vehicle or in a rearward load path in the case of a rear collision of the motor vehicle, and is directly or indirectly connected with a cross-member of a bumper.

13. The vehicle body rail according to claim 12, wherein, in its longitudinal direction, the vehicle body rail has at least one high-collision-energy absorption section, in which the indentations and elevations are formed in the wall, and has at least one low-collision-energy absorption section, in which no indentations and elevations are formed in the wall.

14. The vehicle body rail according to claim 1, wherein
widest regions of the longitudinal grooves are closest a front end of the motor vehicle, along a forward traveling direction thereof, than narrowest regions of the longitudinal grooves.

15. A vehicle body rail for a motor vehicle, which is constructed of fiber-reinforced plastic and is designed as a vehicle body rail which absorbs energy in the event of a collision of the motor vehicle, the vehicle body rail comprising:
a wall having indentations and elevations, the wall being structurally configured to undergo failure by fragmentation in the area of the wall where the indentations and elevations are located upon an application of a predetermined collision threshold load along a longitudinal direction of the vehicle body rail, wherein the indentations and elevations form longitudinal grooves along the longitudinal direction of the vehicle body rail.

16. The vehicle body rail according to claim 15, wherein the longitudinal grooves directly overlap one another along a vertical direction of the vehicle body rail and are formed on opposite external surfaces of the vehicle body rail.

17. The vehicle body rail according to claim 16, wherein widest regions of the longitudinal grooves are closest to either a forwardmost end or a rearmost end of the motor vehicle, along a longitudinal direction of the motor vehicle.

18. The vehicle body rail according to claim 16, wherein a first region of the longitudinal grooves is interposed between opposite second regions of the longitudinal grooves along a longitudinal direction of the vehicle body rail, the first region being the widest of any other region.

* * * * *